(12) United States Patent
Harles et al.

(10) Patent No.: US 6,864,838 B2
(45) Date of Patent: Mar. 8, 2005

(54) RANGING SYSTEM AND METHOD FOR SATELLITES

(75) Inventors: Guy Harles, Fentange (LU); Gerhard Bethscheider, Ayl (DE); Peter Siebert, Wasserliesch (DE)

(73) Assignee: Societe Europeenne des Satellites S.A., Chateau de Betzdorf (LU)

( * ) Notice: Subject to any disclaimer, the term of this patent is extended or adjusted under 35 U.S.C. 154(b) by 0 days.

(21) Appl. No.: 09/922,752

(22) Filed: Aug. 6, 2001

(65) Prior Publication Data

US 2002/0080070 A1 Jun. 27, 2002

Related U.S. Application Data

(63) Continuation of application No. PCT/EP00/00990, filed on Feb. 8, 2000.

(30) Foreign Application Priority Data

Feb. 8, 1999 (EP) .............................. 99101695

(51) Int. Cl.[7] .............................. H01Q 3/22; H01Q 3/24; H01Q 3/26
(52) U.S. Cl. .................................................. 342/375
(58) Field of Search ........................................ 342/375

(56) References Cited

U.S. PATENT DOCUMENTS

| 4,916,455 A | | 4/1990 | Bent et al. |
| 5,548,533 A | * | 8/1996 | Gao et al. |
| 6,430,397 B1 | * | 8/2002 | Willrett ..................... 455/67.1 |

FOREIGN PATENT DOCUMENTS

| WO | WO 95 04942 A | 2/1995 |

* cited by examiner

*Primary Examiner*—Theodore M. Blum
(74) *Attorney, Agent, or Firm*—Wolf, Greenfield & Sacks, P.C.

(57) ABSTRACT

In a satellite ranging system predetermined bit sequence or group of bit sequence in a transport stream, which is a digital signal are used to generate trigger signals on the basis of which the delay introduced into the transport stream by the travel path from a satellite ground station to the satellite and back or to another satellite ground station is determined allowing a calculation of the distance between the ground station(s) and the satellite. The predetermined bit sequence or group of bit sequences may be inserted into the transport stream at the uplink site, for example as a specific payload P. In order to avoid insertion of additional packets the transport stream or part of it may be used as a predetermined bit sequence.

14 Claims, 6 Drawing Sheets

RANGING SYSTEM AND METHOD FOR SATELLITES

CROSS REFERENCE TO RELATED APPLICATION

This application is a continuation of application Ser. No. PCT/EP00/00990, filed Feb. 8, 2000.

FIELD OF THE INVENTION

The present invention relates to ranging of satellites and more general to determining the distance and relative velocity between a sender and a receiver of digitally modulated signals.

BACKGROUND OF THE INVENTION

Geostationary communication satellites have to be positioned in precisely defined space segments assigned by the International Telecommunication Union (ITU) to each satellite. Due to drift the position of a satellite may change and has to be corrected so that it becomes necessary to determine precisely the position and/or movement of the satellite usually addressed as ranging. When analogue signals are send to and received from the satellite several ranging systems have to be used based on precise measurements of the time of travel of the analogue signals. For example, the vertical and/or horizontal synchronization pulses of television signals were used for measuring the travel time of the analogue TV signal. Such signal markers are not available when digital signals are transmitted.

Ranging of satellites, as it should be understood for the purpose of understanding invention to be discussed further below, stands for the task of determining the distance between a ground station and a satellite, especially a geostationary satellite. As an additional aspect, the ranging of satellites may be understood to also but not necessarily comprise the determination of the satellite velocity as the availability of a velocity value provides additional options while determining the distance between the satellite and a ground station and/or controlling the position of the satellite.

SUMMARY OF THE INVENTION

It is therefore an object of the invention to provide a ranging system and method which is capable of measuring precisely the distance between a ground station and a satellite on the basis of a digitally modulated signal.

It is a further object of the invention to provide a ranging system which, additionally or separately, is capable of measuring the relative velocity between a ground station and a satellite on the basis of a digitally modulated signal.

The above object is achieved by a ranging system for determining ranging information of a satellite comprising a first receiving arrangement for receiving a transport stream signal suitable for being transmitted to the satellite and for outputting a first output signal; a second receiving arrangement for receiving said transport stream signal transmitted from the satellite and for outputting a second output signal; and processing means for receiving the first and second output signals of the first and second receiving arrangements, for tracing a predetermined signal pattern in said first and said second output signal and for determining the delay between the first and second output signals on the basis of said tracing of the signal pattern.

According to the invention the first and second receiving arrangements are identical regarding structure and components, i.e. regarding the influence upon the processed signal which for this reason can be assumed to be identically processed, at least with respect to time, in the first and the second receiving arrangement.

Advantageously, the first and second receiving arrangement comprise a tuner, a demodulator and a decoder, the output signals generated by receiving arrangements being a decoded digital signal. The structure and components of the first and second decoding arrangement are, therefore, identical so that the decoding arrangements introduce the same delay into signals.

It is an essential aspect of the invention to propose the use of identical decoding arrangements for decoding the non-delayed and the delayed digital transport stream signals. It has been found that using decoding arrangements of identical structure provides sufficient accuracy for performing precise ranging operations.

Alternatively, but nonetheless advantageously, the first and second receiving arrangements comprise a first and a second tuner, respectively, the output signals generated by said tuners being an analogue signal. The processing means comprise a first and a second processor for receiving the analogue output signals, respectively, for sampling the analogue output signals to obtain a first and a second series of sampled values and for outputting a first and a second trigger signal.

The processors should be understood to be either a microprocessor or microprocessor circuit with a suitable programming, a logic circuit or a similar device capable of performing the required task.

As the distance calculation is based on a time delay, said processing means further comprise a time measurement circuit for receiving said first trigger signal and said second trigger signal from said first and second processors and for measuring the time between said first and said second trigger signal.

Preferably, said processing means further comprise a clock circuit for providing time information to said first and second processors and/or to said time measurement circuit.

Especially for implementation at an uplink site, said first and second receiving arrangements are connected to a satellite antenna for transmitting a signal to said satellite and for receiving a signal from said satellite. Further, said first and second receiving arrangements, said first and second processors, said time measurement circuit and said clock circuit are provided at a ground station further comprising a multiplexer/encoder receiving a plurality of digital payload signals and generating a digital transport stream signal, a modulator for modulating said digital transport stream signal, such modulated digital transport stream signal being supplied to said first decoding arrangement, an upconverter for converting said digital transport stream signal into a signal suitable for being supplied to said satellite antenna and a downconverter for receiving a signal from said satellite antenna and for supplying a modulated digital transport stream signal to said second decoding arrangement.

As an alternative, said processing means may comprise a first time measurement circuit for receiving said first trigger signal from said first processor and time information from a first clock circuit and a second time measurement circuit for receiving said second trigger signal from said second processor and time information from a second clock circuit, wherein said second time measurement circuit transmits the received time information to said first time measurement circuit for measuring the time between said first and said second trigger signal.

Said first-receiving arrangement may connected to a first satellite antenna for transmitting a signal to said satellite and wherein said second receiving arrangement is connected to a second satellite antenna for receiving a signal from said satellite.

As two measurement are performed at different locations said first decoding arrangement, said first processor, said first time measurement circuit and said first clock circuit are provided at a first ground station further comprising a multiplexer/encoder receiving a plurality of digital payload signals and generating a digital transport stream signal, a modulator for modulating said digital transport stream signal, such modulated digital transport stream signal being supplied to said first decoding arrangement, and an upconverter for converting said digital transport stream signal into a signal suitable for being supplied to said first satellite antenna. Then, said second receiving arrangement, said second processor, said second time measurement circuit and said second clock circuit are provided at a second ground station further comprising a downconverter for receiving a signal from said second satellite antenna and for supplying a modulated digital transport stream signal to said second decoding arrangement.

The above object is also achieved by a ranging method comprising the steps of receiving a modulated digital signal, which is based on a digital transport stream, for example according to the MPEG-2 and/or DVB standards, and obtaining a first received digital signal; tracing a predetermined bit sequence or group of bit sequences in the first received digital signal and generating a first trigger signal upon detection of the predetermined bit sequence or group of bit sequences; receiving a delayed modulated digital signal, which is based on said digital transport stream and which is delayed due to traveling along a transmission path, and obtaining a second received digital signal; tracing a predetermined bit sequence or group of bit sequences in the second received digital signal and to generate a second trigger signal upon detection of the predetermined bit sequence or group of bit sequences; and determining the delay on the basis of the first and second trigger signals.

The trigger signals are used to start and stop a timer in order to measure the time delay.

In a further step time stamp information is obtained from a suitable synchronized clocks and processed together with the delay.

In an alternative embodiment, first time stamp information is obtained upon detection of the predetermined bit sequence or group of bit sequences in the first received digital signal, second time stamp information is obtained upon detection of the predetermined bit sequence or group of bit sequences in the second received digital signal and the delay is determined on the basis of the first and second trigger signals as well as the first and second time stamp information. Again, it is essential to precisely synchronize the clock circuits providing the time stamp information.

An alternative method for determining ranging information of a satellite according to the invention comprises the steps of: receiving a modulated digital signal, which is based on a digital transport stream, for example according to the MPEG-2 and/or DVB standards, and obtaining a first received analogue signal; sampling the first received analogue signal and obtaining a first series of sampled values; tracing in said first series of sampled values a signal pattern caused by a predetermined bit sequence or group of bit sequences in the first received analogue signal and generating a first trigger signal upon detection of the predetermined signal pattern; receiving a delayed modulated digital signal, which is based on said digital transport stream and which is delayed due to traveling along a transmission path, and obtaining a second received analogue signal; sampling the second received analogue signal and obtaining a second series of sampled values; tracing in said second series of sampled values a signal pattern caused by a predetermined bit sequence or group of bit sequences in the second received analogue signal and to generate a second trigger signal upon detection of the predetermined signal pattern; and determining the delay on the basis of the first and second trigger signals.

The above further object is achieved by a ranging system for measuring the relative velocity between a ground station and a satellite on the basis of a digitally modulated signal comprising a reference timing means for driving a first digital counting means generating first counter values at a first frequency, a reading/inserting means for reading a momentary counter value of the digital counting means and for inserting said value into said digitally modulated signal, a transmitting means transmitting said digitally modulated signal including the counter value to a satellite, a receiving means for receiving said digitally modulated signal including the counter value from said satellite, an extracting means for extracting the counter value from the received signal, and a second digital counting means being controlled on the basis of said extracted counter value and generating second counter values at a second frequency, the velocity of the satellite being determined on the basis of the deviation between the first and second frequency.

In an advantageous embodiment the reference timing means is a clock. Further, additional timing means can be provided for driving said second digital counting means, especially if the signal from the satellite is received at a remote receiving station. The ranging system according to the invention is especially suited for being used whit a digitally modulated signal which is a digital data stream (DS), especially according to a standard like MPEG/DVB.

Further, the above second object is achieved by a method for measuring the relative velocity between a ground station and a satellite on the basis of a digitally modulated signal comprising the steps driving a first digital counting means with a reference timing means, reading a momentary counter value of said first digital counter means generating first counter values at a first frequency, inserting said value into said digitally modulated signal, transmitting said digitally modulated signal including the counter value to a satellite, receiving said digitally modulated signal including the counter value from said satellite, extracting the counter value from the received signal, controlling on the basis of said extracted counter value a second digital counting means generating second counter values at a second frequency, and determining the velocity of the satellite on the basis of the deviation between said first frequency and second frequency.

For further details of preferred embodiments, reference is made to claims.

BRIEF DESCRIPTION OF THE DRAWINGS

In the following an embodiment of the invention will be described in greater detail and with reference to the drawings.

DETAILED DESCRIPTION

Figure 1:
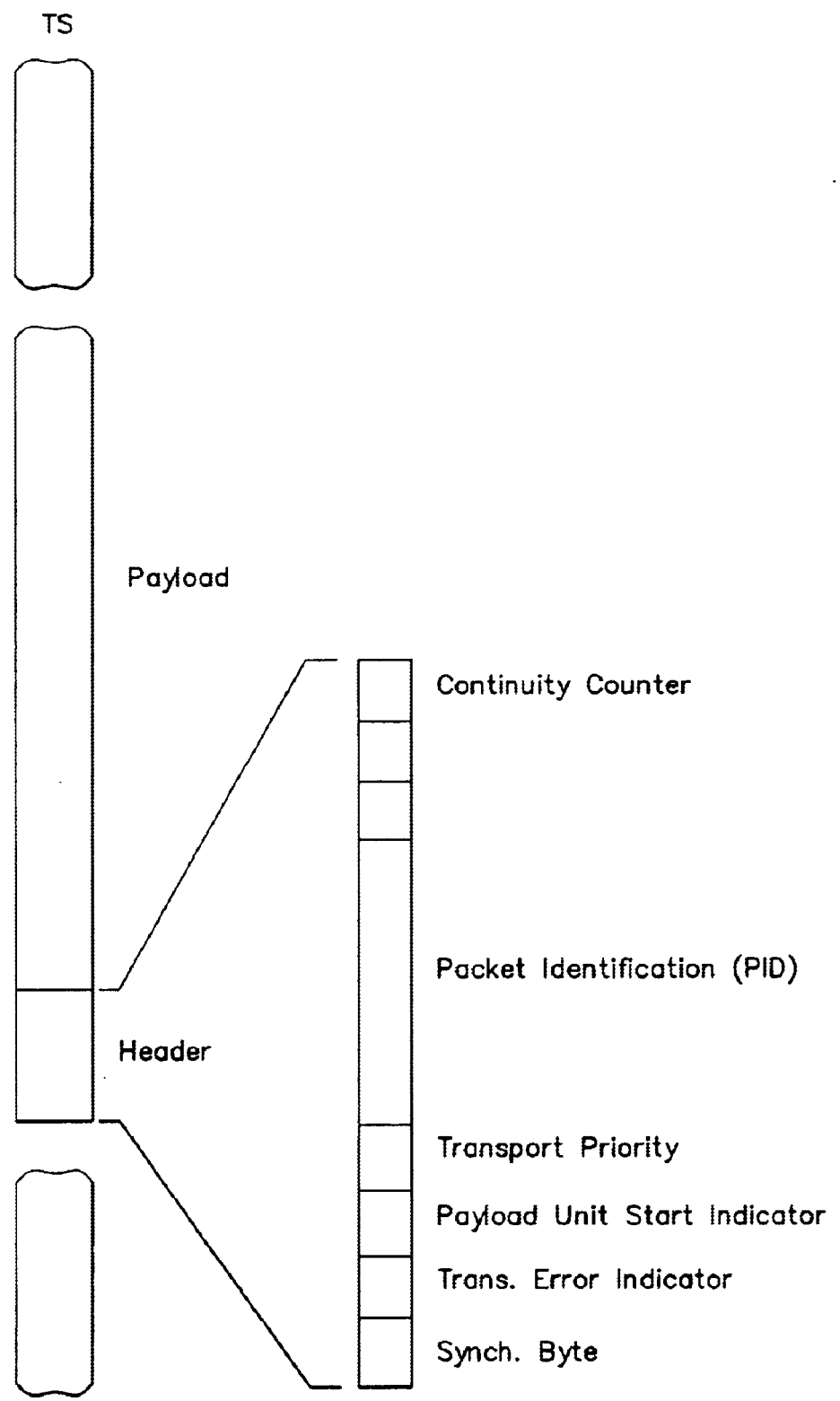
FIG. 1 shows a diagram of a transport stream according to the MPEG-2 standard.

The process of broadcasting digital video, audio and data signals can be understood to be divided into to two sub-processes. The first sub-process relates to the MPEG-2 standards and comprises the processing of elementary digital data streams, including data compression and stream multiplexing, to generate a digital transport stream (TS) the format of which is shown in FIG. 1. The second subprocess deals with error correction schemes which are necessary to achieve a reliable transmission via transmission channels having low SIN ratios.

In FIG. 1 the structure of the MPEG-2 transport stream TS is shown. The transport stream TS is a sequence of packets basically consisting of a header H (4 Bytes) and a payload P (184 Bytes). The header H includes synchronization information (1 Byte), various flags (transport error indicator, payload unit start indicator, transport priority, etc.), a payload identification PID (13 Bits) and a continuity counter (4 Bits). The payload identification PID is required for demultiplexing the individual elementary data streams. An adaptation field is optional but is transmitted at least every 0.1 s and contains ancillary program data especially a program reference clock PCR for regeneration of a 27 MHz clock at the receiving side.

Subsequently, the transport stream TS is processed according to different standards depending on the transmission channel. For transmission via satellites the European DVB satellite standard (DVB-S) may be applied defining inter alia convolutional and Reed-Solomon coding as well as additional error control bits to be added to allow forward error correction (FEC). Similarly, European DVB standards exist for terrestrial (DVB-T) and cable (DVB-C) broadcasting.

According to a first and second preferred embodiment of the invention a predetermined bit sequence or group of bit sequences in the transport stream TS, which is a digital signal, are used to generate trigger signals on the basis of which the delay introduced into the transport stream by the travel path from a satellite ground station to the satellite and back to the same or another satellite ground station is determined allowing a calculation of the distance between the ground station(s) and the satellite. The predetermined bit sequence or group of bit sequences may be inserted into the transport stream TS at the uplink site, for example as a specific payload P. In order to avoid insertion of additional packets the program identification PID or part of it may be used as a predetermined bit sequence. Some PIDs must be present in the transport stream TS but may have a repetition rate which is too high for the purpose of determining ranging information. Then, the PID may be combined with other information of the transport stream header H, e.g. the continuity counter, in order to define a predetermined bit sequence or group of bit sequences.

Figure 2:
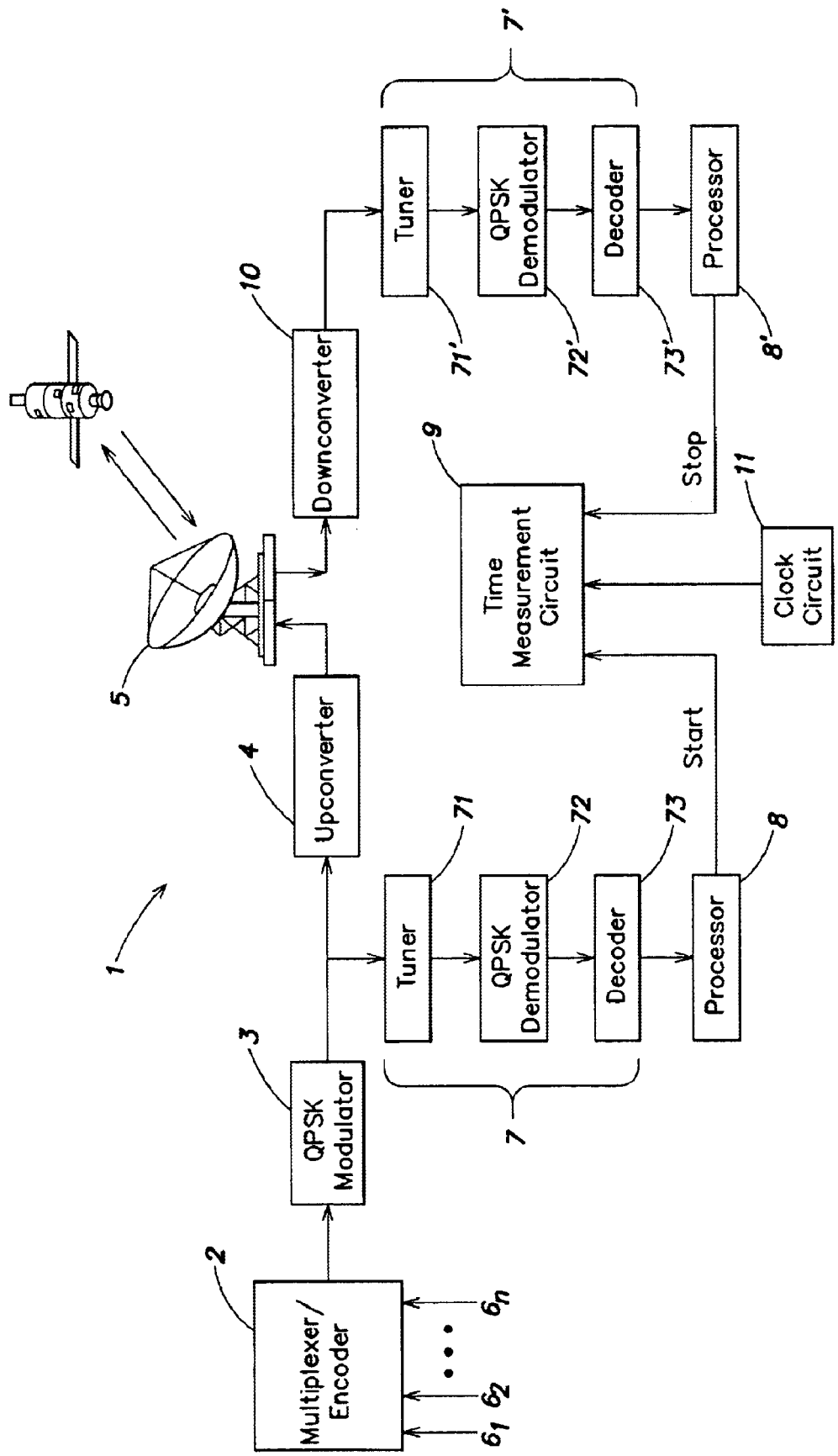
FIG. 2 shows a first embodiment of a ranging system according to the invention.
Figure 3:
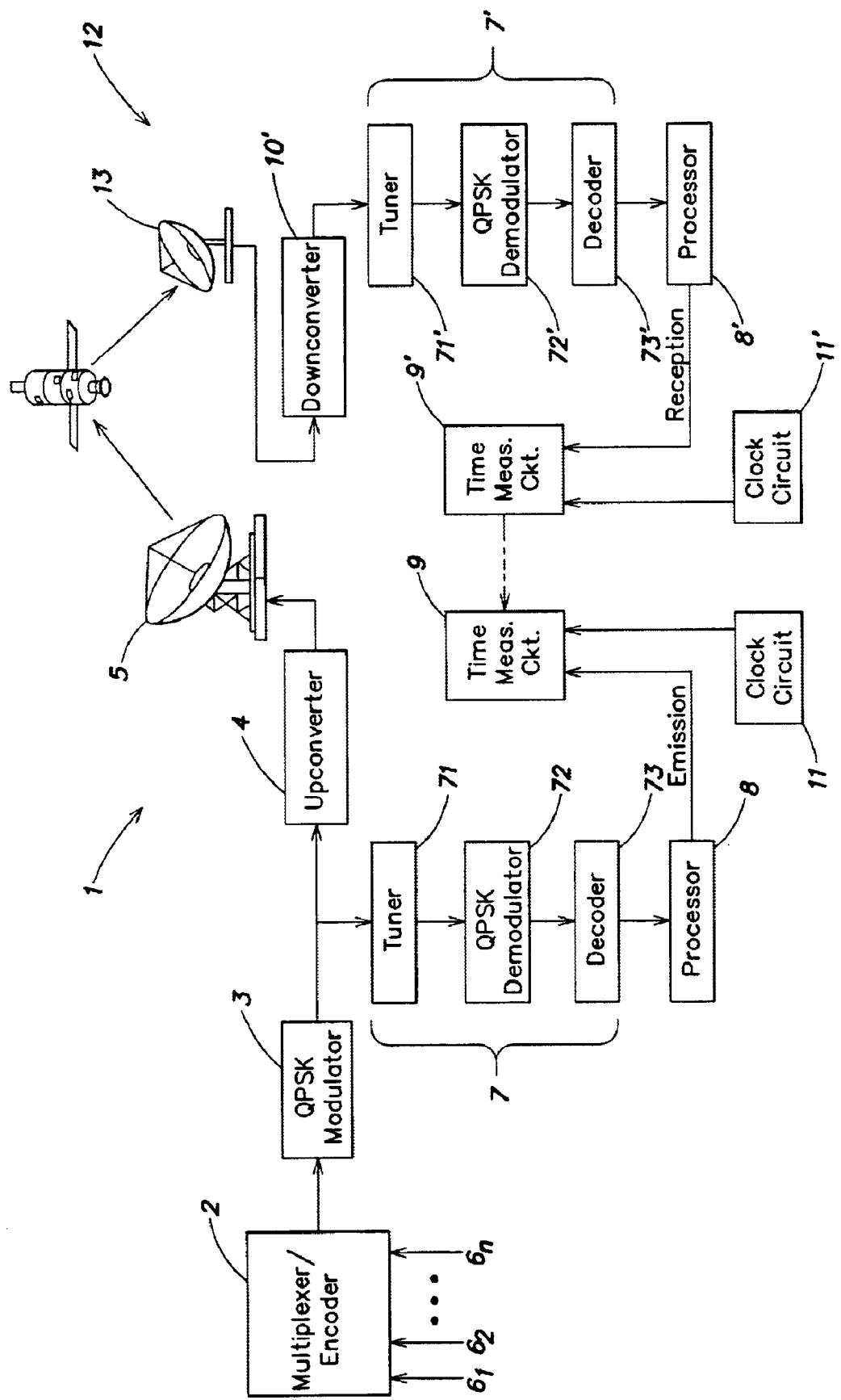
FIG. 3 shows a second embodiment of a ranging system according to the invention.

According to the principles of the first and second preferred embodiment of the invention, receiving arrangements 7,7' as shown in FIGS. 2 and 3, receive a digital transport stream signal suitable for being transmitted to a satellite and output a first and a second digital output signal 0 and 0'. These signals are input into processing means 8, 8' which trace the predetermined bit sequence or group of bit sequences in said first and said second digital output signals and determine the delay between the first and second digital output signals on the basis of said tracing of the bit sequence or group of bit sequences. Each of the receiving arrangements 7, 7' comprises a tuner 71, 71', demodulator 72, 72', and a decoder 73, 73'. The processing means 8, 8' performs the tracing operation on bit level although the bit stream processed by the processing means 8, 8' may vary.

With reference to FIG. 2 further details of the first embodiment will be described. FIG. 2 shows a ground station 1 comprising a multiplexer/encoder 2, a QPSK modulator 3, an upconverter 4 and a satellite antenna 5. Digital payload signals 6-1 to 6-n are elementary data streams and are fed to a multiplexer/encoder 2 which converts the plurality of digital payload signals into a single digital transport stream, for example according to the MPEG-2 and DVB standards as described above with reference to FIG. 1. The digital transport stream is modulated by the QPSK modulator 3 and fed to the upconverter 4 which represents in FIG. 2 the equipment necessary to convert the output of the QPSK modulator 3 into a signal that can be fed to the satellite antenna 5 for transmission to the satellite. Typically, such equipment comprises frequency converters, high power amplifiers etc.

The output signal of the QPSK modulator 3, i.e. the modulated digital transport stream is also fed to a first receiving/decoding arrangement 7 comprising a first tuner 71, a first QPSK demodulator 72 and a first decoder 73. The output signal of the first receiving/decoding arrangement 7 is a digital transport stream which can be processed on bit level. The digital output signal of the first receiving/decoding arrangement 7 is fed to a first processor 8 which analyses the digital output signal of said first receiving/decoding arrangement 7 to trace a predetermined bit sequence or group of bit sequences in the digital output signal of the first receiving/decoding arrangement 7.

If the processor 8 traces the predetermined bit sequence or group of bit sequences in the digital output signal 0 of the first receiving/decoding arrangement 7 it sends a start signal START to a time measurement circuit 9. Upon receipt of the start signal START the time measurement circuit 9 commences to measure the time until it receives a stop signal STOP.

The stop signal STOP is generated by a second processor 8' receiving a digital output signal 0 from a second receiving/decoding arrangement 7' which comprises a second tuner 71', a second QPSK demodulator 72' and a second decoder 73'. The first and second receiving/decoding arrangements 7 and 7' are identical regarding their structure and components. The input signal to the second receiving/decoding arrangement 7' is supplied from a downconverter 10 which receives a signal from the satellite antenna 5 and which comprises all the equipment necessary to convert the received signal from the satellite antenna 5 into a signal corresponding to the output signal of the QPSK modulator 3. However, as the signal has travelled from the satellite antenna 5 to the satellite and back, the received signal is delayed. Apart from the delay the digital output signal 0 of the second decoding arrangement 7' is identical to the digital output signal of the first decoding arrangement 7 if receiving/decoding arrangements 7, 7' having identical structure and components are provided.

For generating the stop signal STOP the second processor 8' traces the predetermined bit sequence or group of bit sequences in the digital output signal 0' of the second receiving/decoding arrangement 7'. Upon detection of the predetermined bit sequence or group of bit sequences the second processor 8' sends the stop signal STOP to the time measurement circuit 9 which stops the time measurement. The measured time corresponds to the distance between the ground station 5 and the satellite.

As two identical receiving/decoding arrangements 7 and 7' are provided the measured time corresponds to the delay between the transmitted signal and the received signal introduced by the signal travel path from the satellite antenna to the satellite and back. Therefore, the distance between the ground station and the satellite can be determined on the basis of the measured time. Delays introduced by the components of the receiving/decoding arrangements can be neglected as the same delay is introduced by the first and by the second receiving/decoding arrangement. The influence of the upconverter 4 and of the downconverter 10 can be taken into account as the delay introduced thereby can easily measured with other measurement equipment, i.e. is known.

In this first embodiment the uplink path and the downlink path are provided at a single ground station so that the signal is transmitted and received at the same location. Therefore, there is no need for time synchronization with respect to distance measurements. When, however, two or more ground stations are used to determine the position of a satellite on the basis of individually measured distances it is necessary to synchronize the clocks at the ground stations in order to ensure that the measurements are performed at almost the same time or that the moment of the individual measurement is known (time stamp information). Otherwise the satellite may have substantially changed its position when the time intervals between the individual measurements are too large. However, in view of the maximum satellite velocity of approx. 2 m/s the accuracy needed is not very high. As described further below, the satellite velocity can also be determined and can be taken into account.

A sufficient synchronization is possible when clock circuits on the basis of the Global Positioning System GPS are used. But also other clock circuits providing a similar synchronization may be employed. In FIG. 2 a clock circuit 11 is shown which supplies time stamp information to the time measurement circuit 9. The time stamp contains information regarding the time of the measurement so that a plurality of measurements at the same or at different locations can be take into consideration in combination.

With reference to FIG. 3 details of the second embodiment of a ranging system according to the invention will be described. FIG. 3 shows an first ground station 1 which in many aspects is identical to the ground station of the first embodiment. Therefore, the same reference signs will be used in the following. The first ground station 1 comprises a multiplexer/encoder 2, a QPSK modulator 3, an upconverter 4 and a first satellite antenna 5. Digital payload signals 6-1 to 6-n are elementary data streams and are fed to the multiplexer/encoder 2 which converts the plurality of digital payload signals into a single digital transport stream, for example according to the MPEG-2 and DVB standards as described above with reference to FIG. 1. The digital transport stream is modulated by QPSK modulator 3 and fed to upconverter 4 which represents in FIG. 3 the equipment necessary to convert the output of the QPSK modulator 3 into a signal that can be fed to satellite antenna 5 for transmission to the satellite. Typically, such equipment comprises frequency converters, high power amplifiers etc.

The output signal of the QPSK modulator 3, i.e. the modulated digital transport stream is also fed to a first receiving/decoding arrangement 7 comprising a first tuner 71, a first QPSK demodulator 72 and a first decoder 73. The output signal 0 of the receiving/decoding arrangement 7 is a digital transport stream which can be processed on bit level. The digital output signal of the first decoding arrangement 7 is fed to a first processor 8 which analyses the digital output signal 0 of said first receiving/decoding arrangement 7 to trace a predetermined bit sequence or group of bit sequences in the digital output signal of the first receiving/decoding arrangement 7.

If the first processor 8 traces the predetermined bit sequence or group of bit sequences in the digital output signal of the first receiving/decoding arrangement 7, it sends a first trigger signal EMISSION to a time measurement circuit 9. Upon receipt of the first trigger signal EMISSION the time measurement circuit 9 registers the time stamp information (the emission time) supplied by a first clock circuit 11 at this instant.

Furthermore, FIG. 3 shows an second ground station 12 comprising a second satellite antenna 13 and a downconverter 10' which receives a signal from the second satellite antenna 13 and which comprises all the equipment necessary to convert the received signal from the satellite antenna 13 into a signal corresponding to the output signal of the QPSK modulator 3. However, as the signal has travelled from the first satellite antenna 5 via the satellite to the second satellite antenna 13, the received signal is delayed.

The output signal of the downconverter 10' is supplied to a second receiving/decoding arrangement 7' which comprises a second tuner 71', a second QPSK demodulator 72' and a second decoder 73'. The first and second receiving/decoding arrangements 7 and 7' are identical regarding their structure and components, i.e. regarding their influences upon the processed signal. The output signal 0' of the second receiving/decoding arrangement 7' is a digital signal and, apart from the delay, is identical to the digital output signal 0 of the first decoding arrangement 7.

The second processor 8' receives the digital output signal 0' of the second receiving/decoding arrangement 7' and traces the predetermined bit sequence or group of bit sequences. Upon detection of the predetermined bit sequence or group of bit sequences the second processor 8' sends a second trigger signal RECEPTION to a time measurement circuit 9' which registers the time stamp information supplied (the reception time) by a second clock circuit 11' lie at this instant.

In the second embodiment, the second time measurement circuit 9' transmits the time stamp information (the reception time) to the first time measurement circuit 9 which calculates the signal delay on the basis of the time stamp information received from the second time measurement circuit 9' and the time stamp information (the emission time) previously registered by the first time measurement circuit 9.

As two identical receiving/decoding arrangements 7 and 7' are provided the difference between the time stamps corresponds to the delay between the transmitted signal and the received signal introduced by the signal travel path from the first satellite antenna 5 via the satellite to the second satellite antenna 13. Delays introduced by the components of the receiving/decoding arrangements can be neglected as the same delay is introduced by the first and by the second receiving/decoding arrangement. The influence of the upconverter 4 and of the downconverter 10' can be taken into account as the delay introduced thereby can easily measured with other measurement equipment, i.e. is known.

In this embodiment the uplink path and the downlink path are provided between the satellite and two separate ground stations so that the signal is transmitted and received at different locations. Therefore, it is necessary to synchronize the clock circuits 11 and 11'. Only if clock circuits 11 and 11' synchronized with high precision are used at the first and second ground station 1 and 12 the delay can be determined on the basis of the time stamp information.

The above described ranging systems carry out a ranging method comprising the following basic steps. In a first step a modulated digital signal, which is based on a digital transport stream, for example according to the MPEG-2 and/or DVB standards, is received and decoded to obtain a first received digital signal. In a second step a predetermined bit sequence or group of bit sequences is traced in the first received digital signal and a first trigger signal is generated upon detection of the predetermined bit sequence or group of bit sequences. In a third step, which may at least partially be carried out in parallel to the first step, a delayed modulated digital signal, which is based on a digital transport stream, for example according to the MPEG-2 and/or DVB standards, and which is delayed due to traveling along a transmission path, is received and decoded to obtain a second received digital signal. In a fourth step a predetermined bit sequence or group of bit sequences is traced in the second received digital signal and a second trigger signal is generated upon detection of the predetermined bit sequence or group of bit sequences. In a fifth step the delay is determined on the basis of the first and second trigger signal. The trigger signals are used to start and stop a timer, respectively, in order to measure the time delay.

In a further step time stamp information is obtained from a suitable clock and processed together with the delay. Thereby, delays determined at different locations can be combined and evaluated relative to each other as the time stamp allows to use delay values measured at the same time. Synchronized clock circuits are necessary in this respect.

The ranging method according to the invention can be carried out at different locations of which one may be an uplink site of a satellite broadcasting system and another one may be reception site of said broadcasting system. Then, first time stamp information is obtained upon detection of the predetermined bit sequence or group of bit sequences in the first received digital signal, second time stamp information is obtained upon detection of the predetermined bit sequence or group of bit sequences in the second received digital signal and the delay is determined on the basis of the first and second trigger signals as well as the first and second time stamp information. It is essential to precisely synchronize the clock circuits providing the time stamp information.

According to a third and fourth preferred embodiment of the invention a predetermined signal pattern in the modulated transport stream, which is a analogue signal, is used to generate trigger signals on the basis of which the delay introduced into the transport stream by the travel path from a satellite ground station to the satellite and back to the same or another satellite ground station is determined allowing a calculation of the distance between the ground station(s) and the satellite. According to a first aspect, the predetermined signal pattern is caused by a bit sequence or group of bit sequences inserted into the transport stream TS at the uplink site, for example as a specific payload P. According to second aspect, the predetermined signal pattern is obtained merely by sampling the modulated digital transport stream, i.e. the analogue signal. Thereby, the insertion of additional packets into the transport stream can be avoided.

Figure 4:
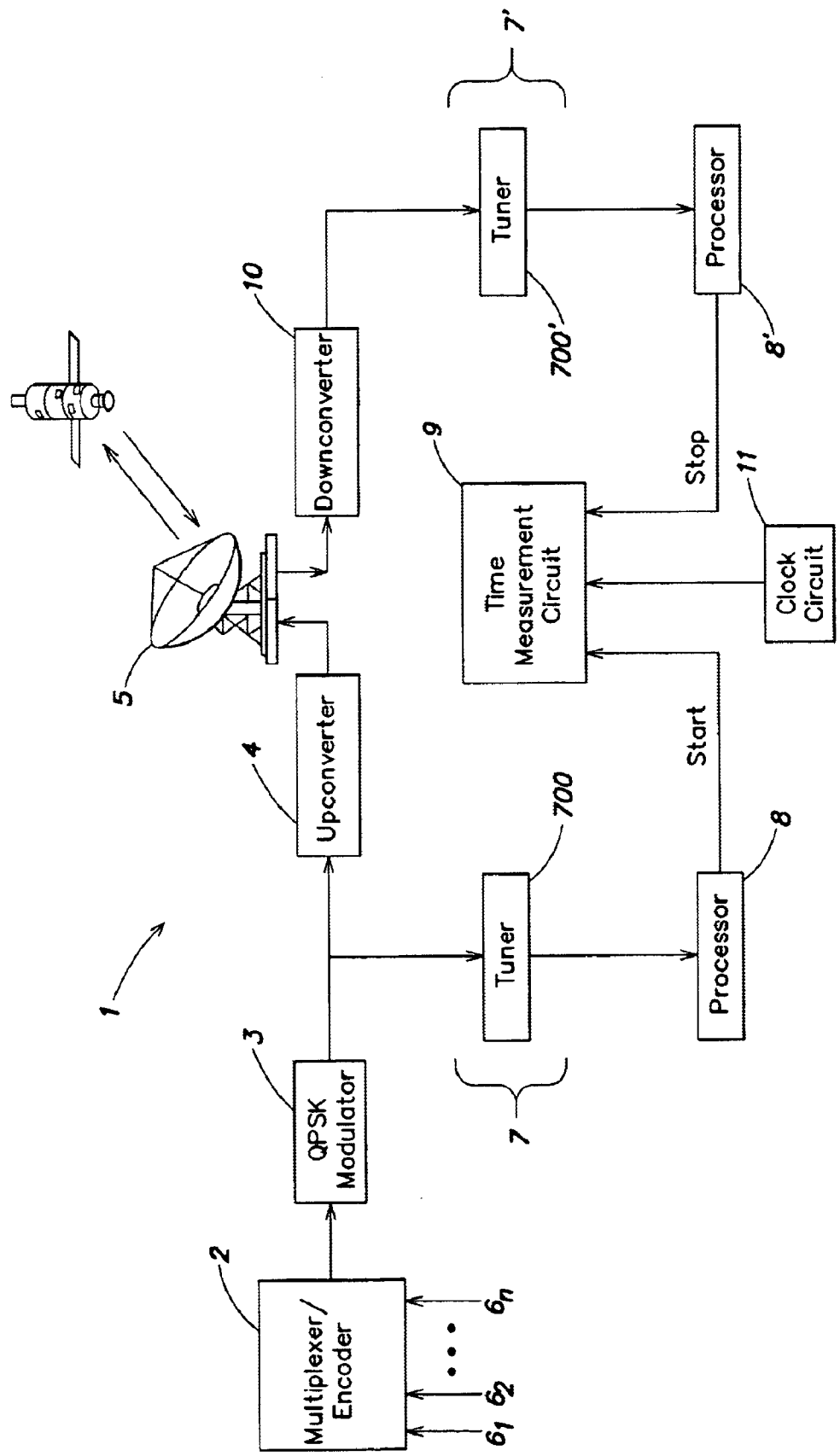
FIG. 4 shows a third embodiment of a ranging system according to the invention.
Figure 5:
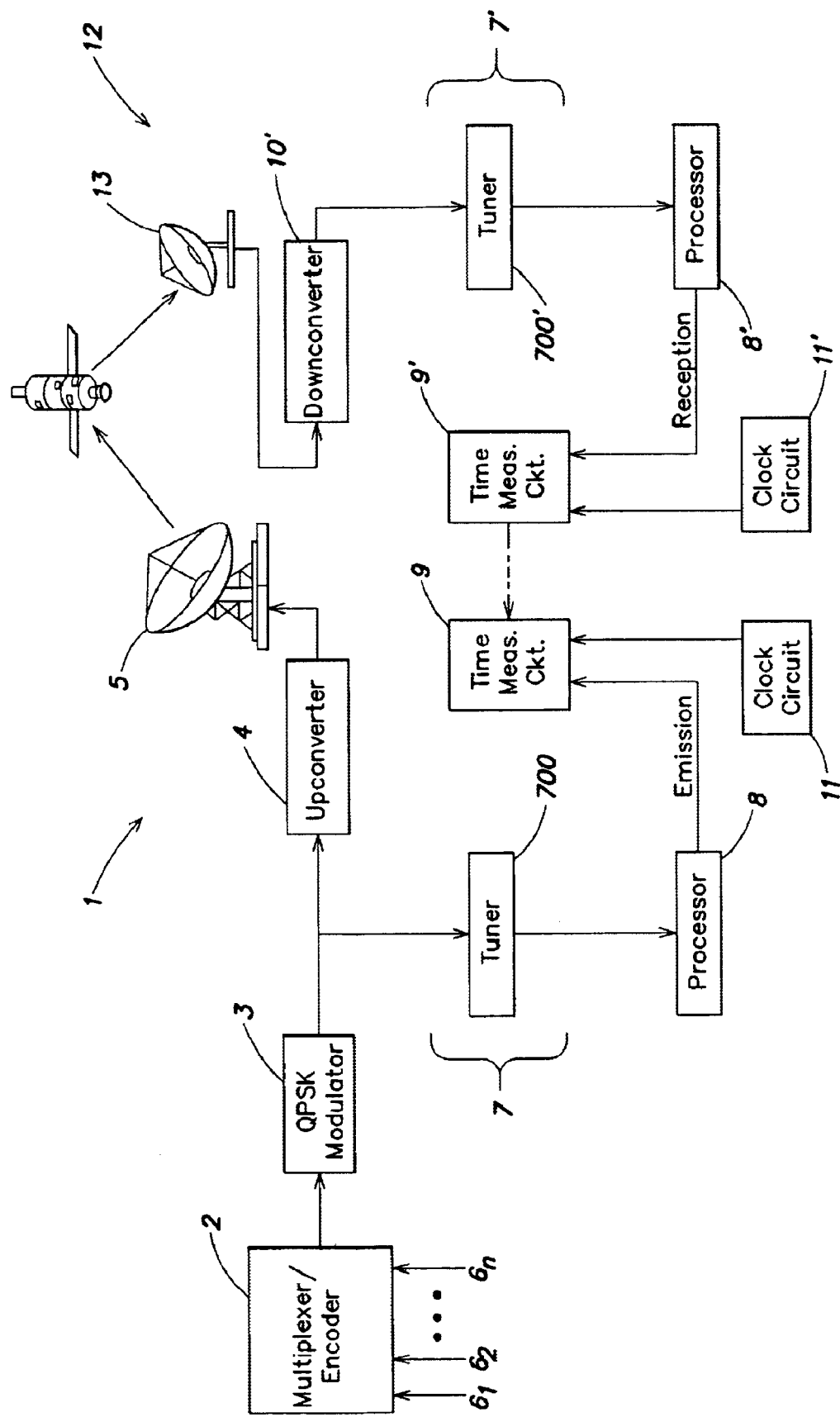
FIG. 5 shows a fourth embodiment of a ranging system according to the invention.

According to the principles of the third and fourth preferred embodiment of the invention, receiving arrangements 7, 7', basically consisting of a tuner as shown in FIGS. 4 and 5, receive a modulated digital transport stream signal suitable for being transmitted to a satellite and output a first and a second output signal. These signals are input into processing means 8, 8' which sample the output signals to obtain and store a series of sampled values. Further, the processors are arranged to trace a predetermined signal pattern in the series of samples of the first and said second output signals and to determine the delay between the first and second digital output signals on the basis of said tracing operation, which may also be understood as a correlating or matching process. The processing means 8, 8' performs the tracing operation on bit level as series of sampled values have been obtained and preferably stored.

With reference to FIG. 4 further details of the third embodiment will be described. FIG. 4 shows an first ground station 1 which corresponds in some aspects to the ground station of the first and second embodiments. Therefore, the same reference signs will be used in the following. As shown in FIG. 4 a ground station 1 comprises a multiplexer/encoder 2, a QPSK modulator 3, an upconverter 4 and a satellite antenna 5. Digital payload signals 6-1 to 6-n are elementary data streams and are fed to a multiplexer/encoder 2 which converts the plurality of digital payload signals into a single digital transport stream, for example according to the MPEG-2 and DVB standards as described above with reference to FIG. 1. The digital transport stream is modulated by the QPSK modulator 3 and fed to the upconverter 4 which represents in FIG. 4 the equipment necessary to convert the output of the QPSK modulator 3 into a signal that can be fed to the satellite antenna 5 for transmission to the satellite. Typically, such equipment comprises frequency converters, high power amplifiers etc.

The output signal of the QPSK modulator 3, i.e. the modulated digital transport stream is also fed to a first receiving arrangement 7 which consists of a first tuner 700. The output signal of the first tuner 700 (receiving arrangement 7) is an analogue signal which can be processed and which corresponds to the digital transport stream. The output signal of the first tuner 700 is fed to a first processor 8 which samples the analogue signal to obtain and store a series of digital values representing the output signal of the tuner 700.

If the ranging operation is based on a signal pattern caused by a predetermined bit sequence or group of bit sequences the sampling and storing operation of processor 8 is carried out in an appropriate time relationship with the time of insertion or occurrence of the predetermined bit sequence or group of bit sequences into the digital transport stream. For example, the sampling operation should be started prior to the insertion or occurrence of the predetermined bit sequence or group of bit sequences but not to early in order to avoid an unnecessarily high number of samples. Thereby, the hardware requirements can be kept within a reasonable range. The sampling operation should not start delayed with respect to the expected signal pattern since in this case the analysis, which will be described further below, may be difficult if not impossible.

The processor 8 analyses the series of samples of the output signal of said first tuner and compares it with a series of values determined on the basis of the predetermined bit sequence or group of bit sequences and the processing which takes place in the multiplexer/encoder 2 and the QPSK modulator 3. Thereby, the processor 8 indirectly traces the predetermined bit sequence or group of bit sequences in the output signal of the first tuner 700. In other words, the processor traces a predetermined signal pattern in the tuner output signal.

If the predetermined signal pattern is traced, the first processor 8 sends a start signal START to a time measurement circuit 9. Upon receipt of the start signal START the time measurement circuit 9 begins to measure the time until it receives a stop signal STOP.

The stop signal STOP is generated by a second processor 8' receiving an output signal from a second receiving arrangement 7' which consists of a second tuner 700'. The first and second tuner 700 and 700' are identical regarding their structure and components. The input signal to the second tuner 700' is supplied from a downconverter 10 which receives a signal from the satellite antenna 5 and which comprises all the equipment necessary to convert the received signal from the satellite antenna 5 into a signal corresponding to the output signal of the QPSK modulator 3. However, as the signal has travelled from the satellite antenna 5 to the satellite and back, the received signal is delayed. Apart from the delay the output signal of the second tuner 700' is, for the purposes of the invention, identical to the output signal of the first tuner 700.

For generating the stop signal STOP the second processor 8' traces the predetermined bit sequence or group of bit sequences, i.e. the predetermined signal pattern, in the output signal of the second tuner 700' in the same manner as the first processor 8. Upon detection of the predetermined bit sequence or group of bit sequences the second processor 8' sends the stop signal STOP to the time measurement circuit 9 which stops the time measurement. The measured time corresponds to the distance between the ground station 5 and the satellite.

As two identical receiving arrangements 7 and 7', i.e. the first and second tuner 700 and 700', are provided the measured time corresponds to the delay between the transmitted-signal and the received signal introduced by the signal travel path from the satellite antenna to the satellite and back. Therefore, the distance between the ground station and the satellite can be determined on the basis of the measured time. Delays introduced by the components of the tuners can be neglected as the same delay is introduced by the first and by the second tuner. The influence of the upconverter 4 and of the downconverter 10 can be taken into account as the delay introduced thereby can easily measured with other measurement equipment, i.e. is known.

As described above, the processors 8 and 8' are arranged to determine a signal pattern in the tuner output signal based on a predetermined bit sequence or group of bit sequences and the known processing in the multiplexer/encoder 2 and the QPSK modulator 3. Alternatively, the first processor 8 may be set up to start the sampling/storing operation at any time to obtain a series of stored values corresponding to the first tuner output signal during the sampling/storing operation. Similarly, the second processor 8' may be set up to start the sampling/storing operation at a corresponding time to obtain a series of stored values corresponding to the second tuner output signal during the sampling/storing operation. The stored sample value series are compared to trace a match or correlation which is indicative of the time delay introduced into the signal by the traveling to the satellite and back. It should be noted that the storage requirements in the second processor 8' may be reduced if the sampling/storing operation is started only after a time which is almost equal but less than the expected delay of the signal. This alternative of the third embodiment also allows to combine the first and second processor into a single processing means avoiding the need for a time measurement circuit 9 since the delay can be determined on the basis of the sampling frequency used in the sampling operation.

In this embodiment the uplink path and the downlink path are provided at a single ground station so that the signal is transmitted and received at the same location. Therefore, there is no need for time synchronization with respect to distance measurements. When, however, two or more ground stations are used to determine the position of a satellite on the basis of individually measured distances it is necessary to synchronize the clocks at the ground stations in order to ensure that the measurements are performed at almost the same time or that the moment of the individual measurement is known (time stamp information). Otherwise the satellite may have substantially changed its position when the time intervals between the individual measurements are to large. However, in view of the maximum satellite velocity of approx. 2 m/s the accuracy needed is not to high. As described further below, the satellite velocity can also be determined and can be taken into account.

As mentioned before, a sufficient synchronization is possible when clock circuits on the basis of the Global Positioning System GPS are used. But also other clock circuits providing a similar synchronization may be employed. In FIG. 4 a clock circuit 11 is shown which supplies time stamp information to the time measurement circuit 9. The time stamp contains information regarding the time of the measurement so that a plurality of measurements at the same or at different locations can be take into consideration in combination.

With reference to FIG. 5 a fourth embodiment of a ranging system according to the invention will be described. FIG. 5 shows an first ground station 1 which in many aspects is identical to the ground station of the third embodiment. Therefore, the same reference signs will be used in the following. The first ground station 1 comprises a multiplexer/encoder 2, a QPSK modulator 3, an upconverter 4 and a first satellite antenna 5. Digital payload signals 6-1 to 6-n are elementary data streams and are fed to the multiplexer/encoder 2 which converts the plurality of digital payload signals into a single digital transport stream, for example according to the MPEG-2 and DVB standards as described above with reference to FIG. 1. The digital transport stream is modulated by QPSK modulator 3 and fed to upconverter 4 which represents in FIG. 5 the equipment necessary to convert the output of the QPSK modulator 3 into a signal that can be fed to satellite antenna 5 for transmission to the satellite. Typically, such equipment comprises frequency converters, high power amplifiers etc.

The output signal of the QPSK modulator 3, i.e. the modulated digital transport stream is also fed to a first receiving arrangement 7 which consists of a first tuner 700. The output signal of the first tuner 700 (receiving arrangement 7) is an analogue signal which can be processed and which corresponds to the digital transport stream. The output signal of the first tuner 700 is fed to a first processor 8 which samples the analogue signal to obtain and store a series of digital values representing the output signal of the tuner 700.

If the ranging operation is based on a signal pattern caused by a predetermined bit sequence or group of bit sequences the sampling and storing operation of processor 8 is carried out in an appropriate time relationship with the time of insertion or occurrence of the predetermined bit sequence or group of bit sequences into the digital transport stream as mentioned above with respect to the third embodiment.

The processor 8 analyses the series of samples of the output signal of said first tuner and compares it with a series of values determined on the basis of the predetermined bit sequence or group of bit sequences and the way the signals are processed by the multiplexer/encoder 2 and the QPSK modulator 3. Thereby, the processor 8 indirectly traces the predetermined bit sequence or group of bit sequences in the output signal of the first tuner 700. In other words, the processor traces a predetermined signal pattern in the tuner output signal.

If the processor 8 traces the predetermined bit sequence or group of bit sequences in the tuner output signal it sends a first trigger signal EMISSION to a time measurement circuit 9. Upon receipt of the first trigger signal EMISSION the time measurement circuit 9 registers the time stamp information (the emission time) supplied by a first clock circuit 11 at this instant.

Furthermore, FIG. 5 shows an second ground station 12 comprising a second satellite antenna 13 and a downconverter 10' which receives a signal from the second satellite antenna 13 and which comprises all the equipment necessary to convert the received signal from the satellite antenna 13 into a signal corresponding to the output signal of the QPSK modulator 3. However, as the signal has travelled from the first satellite antenna 5 via the satellite to the second satellite antenna 13, the received signal is delayed.

The output signal of the downconverter 10' is supplied to a second receiving arrangement 7' which consists of a second tuner 700'. The first and second tuners 700 and 700' are identical regarding their structure and components, i.e. regarding their influences upon the processed signal. The output signal of the second tuner 700' is an analogue signal and, apart from the delay, corresponds to the output signal of the first tuner 700.

The second processor 8' receives the output signal of the second tuner 700' and traces the predetermined bit sequence or group of bit sequences, i.e. the corresponding signal pattern. Upon detection of the predetermined bit sequence or group of bit sequences the second processor 8' sends a second trigger signal RECEPTION to a time measurement circuit 9' which registers the time stamp information supplied (the reception time) by a second clock circuit 11' at this instant.

In the fourth embodiment, the second time measurement circuit 9' transmits the time stamp information (the reception time) to the first time measurement circuit 9 which calculates the signal delay on the basis of the time stamp information received from the second time measurement circuit 9' and the time stamp information (the emission time) previously registered by the first time measurement circuit 9.

As two identical tuners are provided the difference between the time stamps corresponds to the delay between the transmitted signal and the received signal introduced by the signal travel path from the first satellite antenna 5 via the satellite to the second satellite antenna 13. Delays introduced by the components of the tuners can be neglected as the same delay is introduced by the first and by the second tuner. The influence of the upconverter 4 and of the downconverter 10' can also be neglected as the delay introduced thereby is minimal.

In this embodiment the uplink path and the downlink path are provided between the satellite and two separate ground stations so that the signal is transmitted and received at different locations. Therefore, it is necessary to synchronize the clock circuits 11 and 11'. Only if clock circuits 11 and 11' synchronized with high precision are used at the first and second ground station 1 and 12 the delay can be determined on the basis of the time stamp information.

The above described ranging systems of the third an fourth embodiment of the invention carry out a ranging method comprising the following basic steps. In a first step a modulated digital signal, which is based on a digital transport stream, for example according to the MPEG-2 and/or DVB standards, is received and sampled to obtain a first series of sampled values of the modulated digital signal. In a second step a signal pattern corresponding to a predetermined bit sequence or group of bit sequences is traced in the first series of sampled values and a first trigger signal is generated upon detection of the signal pattern. In a third step, which may at least partially be carried out in parallel to the first step, a delayed modulated digital signal, which is based on a digital transport stream, for example according to the MPEG-2 and/or DVB standards, and which is delayed due to traveling along a transmission path, is received and sampled to obtain a second series of sampled values of the received modulated digital signal. In a fourth step a signal pattern corresponding to the predetermined bit sequence or group of bit sequences is traced in the second series of sampled values and a second trigger signal is generated upon detection of the signal pattern. In a fifth step the delay is determined on the basis of the first and second trigger signal. The trigger signals are used to start and stop a timer, respectively, in order to measure the time delay.

In a further step time stamp information is obtained from a suitable clock and processed together with the delay. Thereby, if required, delays determined at different locations can be combined and evaluated relative to each other as the time stamp allows to use delay values measured at the same time. Synchronized clock circuits are necessary in this respect.

The ranging method according to the invention can be carried out at different locations of which one may be an uplink site of a satellite broadcasting system and another one may be reception site of said broadcasting system. Then, first time stamp information is obtained upon detection of the signal pattern in the first tuner output signal, second time stamp information is obtained upon detection of the signal pattern in the second tuner output signal and the delay is determined on the basis of the first and second trigger signals as well as the first and second time stamp information. It is essential to precisely synchronize the clock circuits providing the time stamp information.

The invention may also be carried out by providing receiving means which comprise of a tuner and a demodulator. The output signal of such receiving means, i.e. the output signal(s) of the demodulator, for example the I and Q signals of a QPSK demodulator, is then fed to processing means which are adapted to trace a signal pattern in the demodulated signal. Therefore the above description of two basic alternative embodiments can be understood by those skilled in the art to describe also details of a ranging system having receiving means comprising a tuner and a demodulator.

Further, those skilled in the art will appreciate that it is advantageous to have available also information concerning velocity of a satellite in order to perform ranging measurements and/or position control of satellite. Therefore, a system and method for measuring the relative velocity of a satellite will be described which may be used separately but which is especially suitable for being used in combination with anyone of the systems and methods described above.

Figure 6:
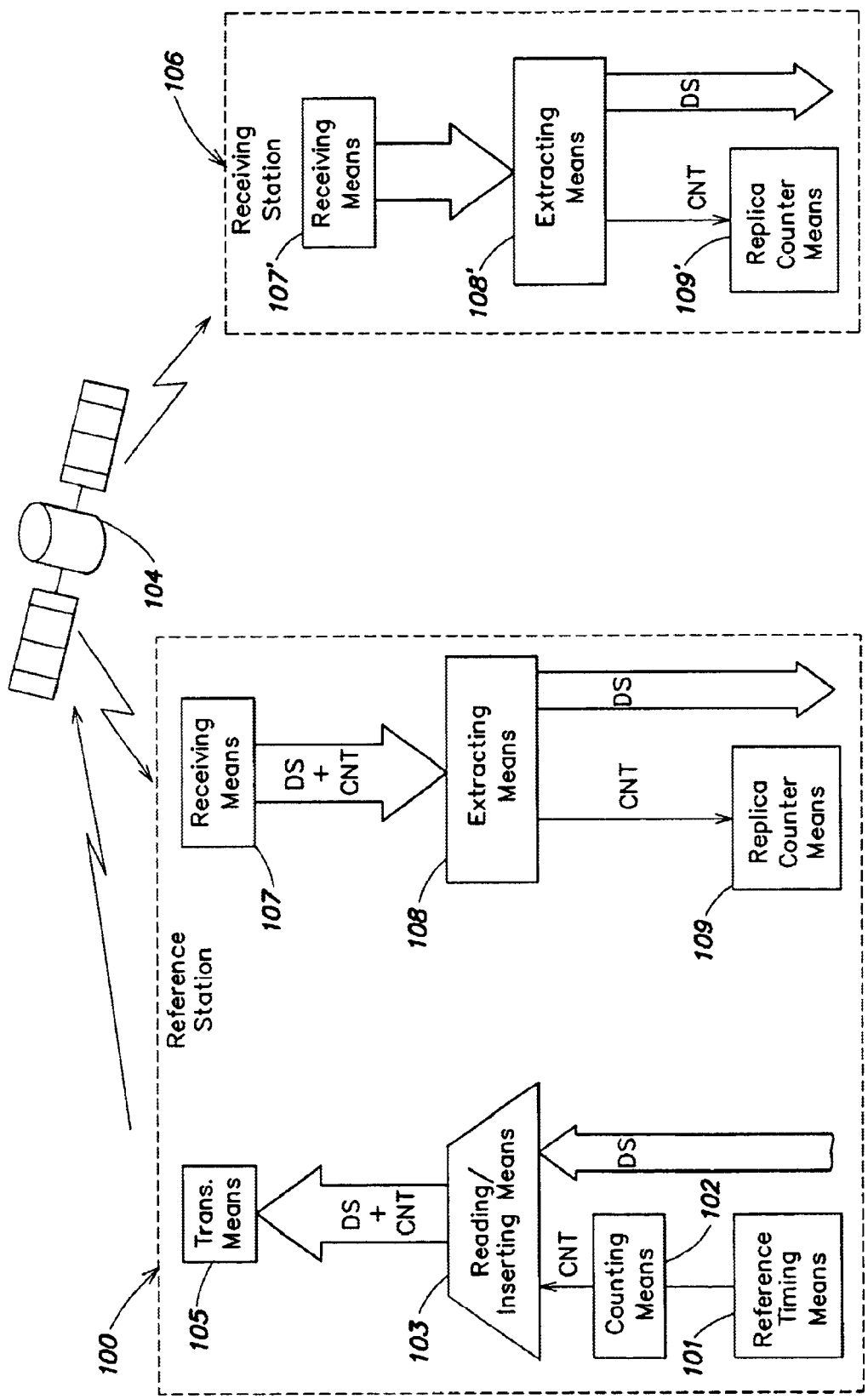
FIG. 6 shows an additional aspect related to the ranging system according to the invention.

With reference to FIG. 6 a ranging system according to this aspect of the invention which is capable of measuring the relative velocity between a ground station and a satellite on the basis of a digitally modulated signal will be described in the following. A reference station 100 comprises a reference timing means 101, for example a clock, which drives a digital counting means 102. In predetermined, preferably regular time intervals a reading/inserting means 103 reads the momentary value CNT of the digital counting means 102 and inserts the value into a digital data stream DS. The digital data stream DS including the counter value CNT is transmitted to a satellite 104 by transmitting means 105 of the reference station 100. The satellite 104 retransmits the digital data stream DS including the counter value CNT to be received by either the reference station 100 or any other receiving station 106 both of which being provided with respective receiving means 107, 107'.

In the reference station 100 and/or the receiving station 106 an extracting means 108, 108' is provided which extracts the counter value CNT from the received signal, i.e. separates the counter values CNT from the digital data stream DS. The extracted (separated) counter value CNT is used to control a replica counting means 109 in the reference station 100 and/or a replica counting means 109' in the receiving station 106. An additional timing means, for example a clock, (not shown in FIG. 6) may be used for supplying a driving signal to the replica counter means 109, 109' such that the extracted (separated) counter value CNT is sufficient for controlling the replica counter means 109, 109' at the times when the counter value CNT is extracted (separated) from the received signal, i.e. digital data stream DS. In the case of the ground station 100 the reference timing means 101 may be used instead of an additional timing means. This approach is advantageous as no further clock synchronization is required since a single clock is used. In the case of the receiving station 106 additional timing means should be provided.

The frequency of the replica counting means 109, 109' differs from the frequency of the digital counting means 102 in the reference station due to the Doppler shift caused by the satellite motion relative to the reference station 100 and the receiving station 106, respectively. The frequency deviation can be determined at the reference station 100 and/or the receiving station 106 and the velocity of the satellite can be calculated.

With respect to the receiving station 106 it should be noted that it requires precise frequency synchronization with the reference station 100, either directly (counting means 102) or via a common frequency standard, in order to determine the velocity of the spacecraft with the desired precision. Alternatively, a reference timing means may be provided also at the receiving station 106, which timing means drives a digital counting means also provided at the receiving station. Then, the timing means at the ground station 100 and at the receiving station 106 need to synchronized. The means and methods for synchronizing clocks at remote locations described above can be used also in the case of determining the relative velocity of a spacecraft. Therefore reference is made to the above description and an additional description is omitted.

In a MPEG/DVB system the clock of the reference station provides a stable 27 MHz reference frequency clock with low phase noise. The clock values are converted and distributed according to the MPEG standard time stamp mechanism (PCR). Based on the received time stamps either the reference station 100 or the receiving station 106 can reconstruct the 27 MHz clock influenced by the motion of the satellite.

Typical Doppler shift for geostationary satellites are in the range of 0.1 to 0.5 Hz.

What is claimed is:

1. Apparatus for calculating the signal delay of a payload signal travelled through a communication channel, comprising:
   first receiving means for receiving a first time stamp information from a first processing means (8), wherein the first time stamp information was detected in a first payload signal suitable for being transmitted through said communication channel;
   second receiving means for receiving a second time stamp information from a second processing means (8'), wherein the second time stamp information was detected in a second payload signal and wherein the second payload signal is delayed due to travelling through the communication channel; and
   calculating means for calculating the signal delay on the basis of the first time stamp information and the second time stamp information.

2. Apparatus according to claim 1, wherein the first payload signal is a modulated digital transport stream signal suitable for being transmitted through said communication channel and wherein the second payload signal is a modulated digital transport stream signal having been travelled through said communication channel.

3. Apparatus according to claim 1, wherein the first payload signal is a modulated analogue signal suitable for being transmitted through said communication channel and wherein the second payload signal is a modulated analogue signal having been travelled through said communication channel.

4. Apparatus according to claim 1, wherein the communication channel is a satellite communication channel.

5. Apparatus according to claim 4, wherein the uplink path and the downlink path of the satellite communication channel are provided between a satellite and one single ground station and wherein said first processing means (8), said second processing means (8') and said calculating means are located in the single ground station.

6. Apparatus according to claim 4, wherein the uplink path and the downlink path of the satellite communication channel are provided between a satellite, a first ground station and a second ground station, wherein said first processing means (8) and said calculating means are located in the first ground station, and wherein the second processing means (8') is located in the second ground station.

7. Apparatus according to claim 6, wherein the first processing means (8) comprises a first clock circuit (11) for obtaining the first time stamp information and the second processing means (8') comprises a second clock circuit (11') for obtaining the second time stamp information, and wherein the first clock circuit (11) and the second clock circuit (11') are synchronized.

8. Method for calculating the signal delay of a payload signal travelled through a communication channel, comprising:
   receiving a first time stamp information from a first processing means (8), wherein the first time stamp information was detected in the first payload signal suitable for being transmitted through said communication channel;
   receiving a second time stamp information from a second processing means (8'), wherein the second time stamp information was detected in the second payload signal and wherein the second payload signal is delayed due to travelling through the communication channel; and
   calculating the signal delay on the basis of the first time stamp information and the second time stamp information.

9. Method according to claim 8, wherein the first payload signal is a modulated digital transport stream signal suitable for being transmitted through said communication channel and wherein the second payload signal is a modulated digital transport stream signal having been travelled through said communication channel.

10. Method according to claim 8, wherein the first payload signal is a modulated analogue signal suitable for being transmitted through said communication channel and wherein the second payload signal is a modulated analogue signal having been travelled through said communication channel.

11. Method according to claim 8, wherein the communication channel is a satellite communication channel.

12. Method according to claim 11, wherein the uplink path and the downlink path of the satellite communication channel are provided between a satellite and one single ground station and wherein said first processing means (8) and said second processing means (8') are located in the single ground station.

13. Method according to claim 11, wherein the uplink path and the downlink path of the satellite communication channel are provided between a satellite, a first ground station and a second ground station, wherein said first processing means (8) is located in the first ground station, and wherein the second processing means (8') is located in the second ground station.

14. Method according to claim 13, wherein the first processing means (8) comprises a first clock circuit (11) for obtaining the first time stamp information and the second processing means (8') comprises a second clock circuit (11') for obtaining the second time stamp information, and wherein the first clock circuit (11) and the second clock circuit (11') are synchronized.

\* \* \* \* \*